United States Patent [19]
Dover

[11] Patent Number: 5,626,195
[45] Date of Patent: May 6, 1997

[54] SOD HARVESTING SYSTEM

[75] Inventor: Gary H. Dover, Bucyrus, Kans.

[73] Assignee: Bucyrus Equipment Co., Inc., Bucyrus, Kans.

[21] Appl. No.: 500,492

[22] Filed: Jul. 10, 1995

[51] Int. Cl.$^6$ .................................................. A01B 45/04
[52] U.S. Cl. .......................................... 172/19; 414/789.7
[58] Field of Search ................... 172/19, 20; 414/789.7; 280/455.1, 457, 789, 442, 443, 86

[56] References Cited

U.S. PATENT DOCUMENTS

| | | |
|---|---|---|
| Re. 34,827 | 1/1995 | Dover et al. ............... 172/19 |
| 2,345,425 | 3/1944 | Phillips . |
| 2,614,477 | 10/1952 | Habenicht . |
| 2,617,347 | 11/1952 | Provost . |
| 2,756,661 | 7/1956 | Frisbie et al. . |
| 2,982,565 | 5/1961 | Lance ........................ 280/457 |
| 2,998,081 | 8/1961 | Hartmangruber et al. . |
| 3,464,641 | 9/1969 | Brouwer . |
| 3,509,944 | 5/1970 | Brouwer et al. . |
| 3,519,082 | 7/1970 | Miner . |
| 3,540,535 | 11/1970 | Brouwer et al. . |
| 3,590,927 | 7/1971 | Brouwer et al. . |
| 3,613,921 | 10/1971 | Ryden ....................... 280/443 |
| 3,658,134 | 4/1972 | Bibby . |
| 3,672,452 | 6/1972 | Miner . |
| 3,675,793 | 7/1972 | Wetzel . |
| 3,747,686 | 7/1973 | Beck . |
| 3,807,504 | 4/1974 | Nunes, Jr. . |
| 3,861,535 | 1/1975 | Huxley et al. ............. 414/789.7 |
| 3,877,584 | 4/1975 | Holcombe . |
| 3,887,013 | 6/1975 | Helberg . |
| 3,935,904 | 2/1976 | Beck . |
| 3,989,269 | 11/1976 | Rendessy .................. 280/457 |
| 4,049,060 | 9/1977 | Hoke . |
| 4,142,691 | 3/1979 | Watton . |
| 4,162,726 | 7/1979 | Hudson et al. . |
| 4,294,316 | 10/1981 | Hedley et al. . |
| 4,354,556 | 10/1982 | Evans . |
| 4,408,666 | 10/1983 | Lawson . |
| 4,828,040 | 5/1989 | Schumacher . |
| 4,892,153 | 1/1990 | Cooling et al. . |
| 4,903,778 | 2/1990 | Brouwer et al. . |
| 4,944,352 | 7/1990 | Brouwer et al. . |
| 4,966,239 | 10/1990 | Hutchison . |
| 5,064,000 | 11/1991 | Dover et al. ............... 172/19 |
| 5,217,078 | 6/1993 | Zinn .......................... 172/19 |
| 5,230,602 | 7/1993 | Schouten . |
| 5,232,055 | 8/1993 | Van Vuuren ............... 172/19 |
| 5,269,379 | 12/1993 | Millar et al. ............... 172/19 |

FOREIGN PATENT DOCUMENTS

| | | | |
|---|---|---|---|
| 0153103 | 8/1985 | European Pat. Off. . | |
| 243779 | 11/1987 | European Pat. Off. ........ | 172/19 |

*Primary Examiner*—Terry Lee Melius
*Assistant Examiner*—Victor Batson
*Attorney, Agent, or Firm*—Litman, McMahon and Brown, L.L.C.

[57] ABSTRACT

A sod harvesting apparatus including a cutting unit and a sod stacking unit and which is selectively configurable to harvest sod in the form of slabs, small rolls or large rolls. The cutting unit includes at least one sod cutting blade for cutting a strip of sod from the ground, a sod cut-off mechanism which is selectively engageable to cut a strip of sod across its length at set intervals and a conveyor assembly for conveying the cut strips of sod away from said cutting blade. Roller supports, upon which a roller is removably securable are secured to the cutting unit on opposite sides of the conveyor assembly for use in forming large rolls of sod. A small roll roller attachment is removably securable to the cutting unit to extend across the conveyor assembly for flipping a leading edge of a strip of sod onto itself as it is conveyed up the conveyor assembly and causing the sod to roll upon itself for forming small rolls. The sod stacking unit generally comprises a trailer selectively securable to the cutting unit upon which sod in the form of small rolls and slabs may be stacked.

21 Claims, 4 Drawing Sheets

001
SOD HARVESTING SYSTEM

BACKGROUND OF THE INVENTION

I. Field of the Invention

The present invention relates in general to methods of, and apparatus for, cutting sod. In particular, the present invention relates to an apparatus which facilitates the harvesting of sod in slabs, small rolls and large rolls.

II. Description of Related Art

It has been known for many years to remove sod from fields of grass for later placement at remote locations to produce, in a short amount of time, lawns which are aesthetically pleasing. Various devices for removing the sod from the fields of grass have also been known. These devices are typically in the form of a trailer drawn behind or beside a tractor or other vehicle. The trailer includes a cutting blade extending parallel to the ground which is introduced into the soil and drawn along with the trailer to cut loose the sod from the soil. An inclined conveyor is typically arranged immediately behind the cutting blade to receive the sod after it has been cut. The cut sod is transported up the inclined conveyor to a point where it may be manually or mechanically placed upon a pallet.

Two general types of sod are produced. These are slab sod and roll sod. Slab sod is produced as noted above with a transverse cut being made through the strip of sod before or while it is produced. The slabs are then stacked upon the pallet as noted above.

It is also known to produce roll sod in two relative sizes, small rolls and large rolls. Small rolls are generally formed by rolling relatively short strips of sod to produce a spiral roll. The finished rolls have a diameter which is typically smaller than the width of the strip of sod forming the roll. The finished rolls are typically stacked upon pallets as with slab sod.

Large rolls or big rolls are formed from longer strips of sod and the finished rolls generally have a diameter which is larger than the width of the strip of sod forming the roll. Large rolls are generally formed by wrapping the strip of sod around a tube, roller or mandrel in a spiral configuration. After rolling, the large rolls are maneuvered using the tube, roller or mandrel.

Currently available systems do not permit the selective harvesting of sod in the form of slabs, small rolls and large rolls. Separate equipment is required to produce large rolls of sod as opposed to slabs or small rolls.

SUMMARY OF THE INVENTION

The present invention is an apparatus for harvesting sod which comprises a cutting unit and a sod stacking unit which is selectively configurable to harvest sod in the form of slabs, small rolls or large rolls. The cutting unit includes a frame and means for allowing movement of the cutting unit frame with respect to the ground in a cutting direction. At least one cutting blade for cutting a strip of sod from the ground is connected to the cutting unit frame. The cutting unit includes a sod cut-off mechanism connected to the cutting unit frame and which is selectively engageable to cut a strip of sod across its length at set intervals.

The cutting unit includes an inclined conveyor assembly positioned behind the cutting blade for receiving a strip of sod after it is cut from the ground by the cutting blade and for conveying the strip of sod away from the cutting blade. Roller or mandrel supports are secured to the cutting unit on opposite sides of the conveyor assembly. A mandrel or roller, upon which sod is to be wound in a spiral configuration, is rotatably and removably securable to the mandrel supports to extend across the conveyor assembly. Using the mandrel, sod may be wound in large rolls.

An attachment for forming small rolls is removably securable to the cutting unit to extend across the conveyor assembly. The attachment flips a leading edge of a strip of sod onto itself as it is conveyed up the conveyor assembly and causes the sod to roll upon itself. Use of the attachment in combination with the sod cut-off mechanism facilitates production of sod in small rolls.

The sod stacking unit generally comprises a sod stacking trailer selectively securable to the cutting unit frame at a rear end thereof. The sod stacking trailer comprises a trailer frame having a forward frame member extending transverse to the direction of travel of the apparatus and a pair of opposed side frame members extending rearwardly from the forward frame member to define a sod receiving space therebetween. A fork lift assembly is secured to the forward frame member and has fork prongs extending into the sod receiving space. A worker support platform is mounted on each of the side frame members on opposite sides of the sod receiving space.

A strut is pivotally connected to a rear end of each of the side frame members. Each strut is pivotable between a retracted alignment to an extended alignment. A locking mechanism is provided for locking the struts in the extended or retracted alignment. A wheel is swivelly connected to each of the struts. When the struts are positioned in the extended alignment, the wheels are positioned outside of the side members of the trailer frame.

The worker support platforms are positioned, such that workers standing thereon can reach the sod at a rear end of the conveyor assembly and lift the sod and stack it on a pallet supported on the fork prongs. As the amount of sod stacked on the pallet increases the fork prongs may be lowered using controls accessible to at least one of the workers. When the pallet is full or otherwise ready for removal, the fork prongs may be lowered until the pallet comes in contact with the ground. The trailer is then advanced forward and away from the pallet such that an open end of the trailer passes by the pallet. The wheels positioned outside of the side members of the trailer frame also advance around the pallet. The struts are positioned in the retracted alignment when it is desirable to reduce the overall width of the trailer, particularly when traveling on public roads.

OBJECTS AND ADVANTAGES OF THE INVENTION

The objects and advantages of the invention include: providing a sod harvesting system which permits sod to be harvested in the form of slabs, rolls of relatively small diameter and rolls of relatively large diameter; to provide such a sod harvesting system which permits conversion from a unit adapted to harvest sod in the form of large rolls to a unit adapted to harvest sod in the form of small rolls or slabs; to provide such a sod harvesting system which includes a sod cutting unit having a sod cutting blade to cut strips of sod from the ground and a conveyor assembly for conveying strips of sod away from the cutting blade; to provide such a sod harvesting system which includes a sod cut-off mechanism which is selectively engageable to cut strips of sod along their length at set intervals; to provide such a system which includes means for supporting a roller about which sod may be rolled such that the roller extends across the conveyor assembly; to provide such a sod harvesting system which includes a small roll rolling attachment which is removably securable to the apparatus to extend across the conveyor assembly; to provide such a system which includes a sod stacking trailer removably securable to the sod cutting unit; to provide such a system wherein the sod stacking trailer includes worker support platforms secured to a frame on opposite sides of a sod stacking space; to provide such a system including a fork lift assembly secured to the frame and having fork prongs extending into the sod stacking space; to provide such a system wherein the sod stacking trailer has an open end; to provide such a system wherein the trailer includes a pair of wheels swivelly mounted on opposite sides of the frame and pivotal from an extended position to a retracted position; to provide such a system which may be adapted to mate a sheet of flexible netting with the sod as it is harvested; to provide such a system which may be pulled behind a standard tractor and to provide such a system which is relatively easy to operate.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Referring to the drawings in more detail, the reference numeral 1 refers to the sod harvesting system of the present invention. The system 1 generally comprises a sod cutting unit 2 and a sod stacking unit 3. The sod cutting unit 2 is a modified version of the sod cutting unit as disclosed in United States Patent to Dover et al. No. Re. 34,827 (the Dover '827 patent) which is hereby incorporated by reference.

Figure 1:
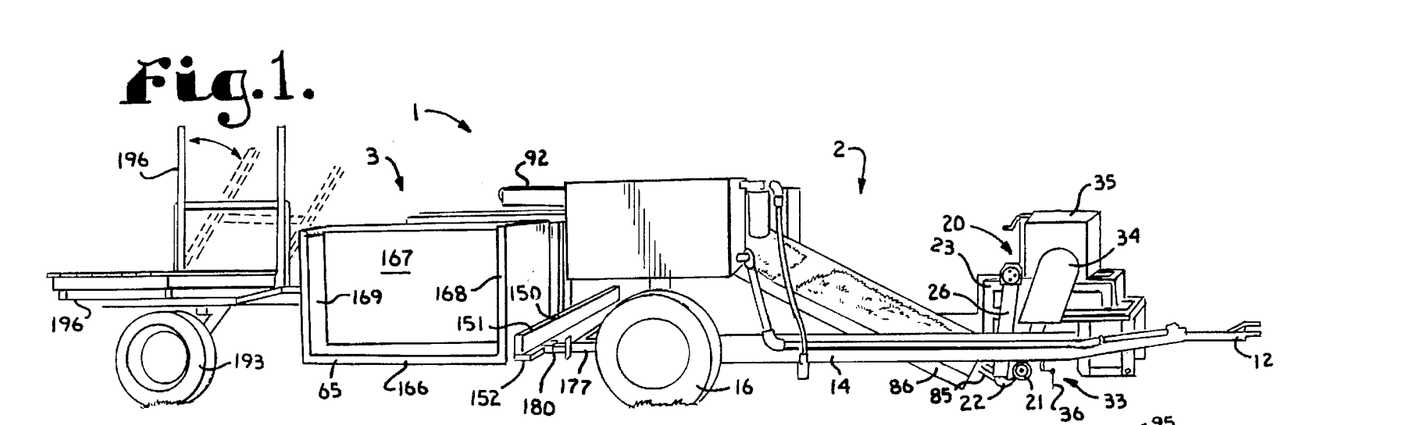
FIG. 1 is a perspective view of the sod harvesting system of the present invention including a sod cutting unit and a sod stacking unit.

As seen in FIG. 1, The cutting unit 2 takes the general form of a trailer. The forward end of the unit 2 includes a trailer hitch 12 of standard design. The hitch 12 is rigidly connected to a rigid main frame 14. Near the rearward end of the cutting unit 2, a pair of wheels 16 (one of which is shown) are mounted to the main frame 14 for rotation with respect thereto. As with a typical trailer, the wheels 16 and hitch 12, when attached to a towing vehicle, support the main frame 14 above the ground level.

The cutting unit 2 is of course not limited to a trailer pulled by a towing vehicle. Specifically, the main frame 14 may be attached to the side of a vehicle, or may be part of a self-propelled vehicle.

Figure 3:
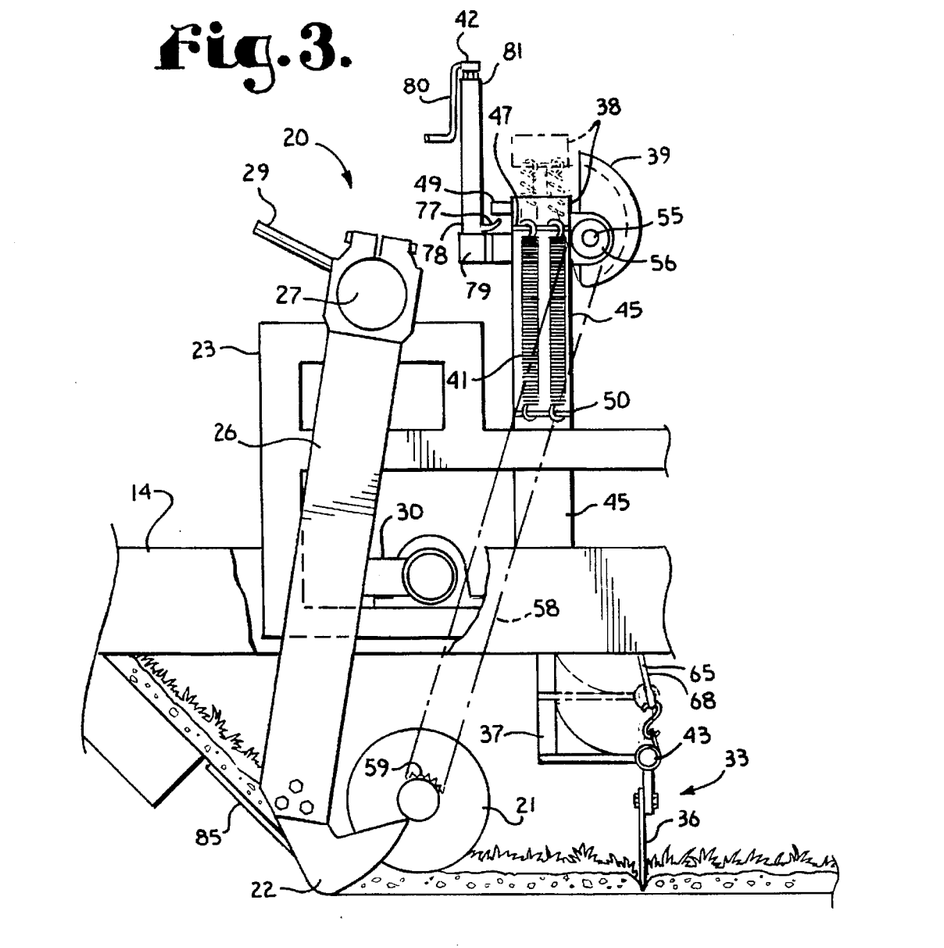
FIG. 3 is an enlarged and fragmentary side view of the sod cutting unit showing a sod cutting assembly and a sod cut-off mechanism with portions broken away to show interior detail.

Mounted to the main frame 14 at a front end thereof in side by side alignment are a pair of sod cutting assemblies 20, one of which is shown in FIG. 1 and FIG. 3. Each sod cutting assembly 20 includes a roller 21 and a cutting blade 22 mounted to a subframe 23 which is mounted to the mainframe 14 as generally disclosed in the Dover '827 patent. The subframes 23 permit the rollers 21 and the cutting blades 22 to follow the contours of the soil. Each cutting blade 22 is elongated and extends laterally slightly behind and below the rollers 21. In operation, the cutting blades 22 will be positioned a desired depth below the surface of the soil to cut the soil and grass roots to form the sod.

As shown in FIG. 3, the blades 22 are mounted to the sub-frames 23 by an upwardly extending blade support 26 mounted to each lateral end of each cutting blade 22. The upper end of each blade support 26 is pivotally mounted about an adjustment cam 27. Each pair of circular adjustment cams 27 associated with each cutting assembly 20 is connected together by an adjustment rod (not shown). The adjustment rod extends between the adjustment cams 27 and is connected thereto at a point spaced from the center of each adjustment cam 27. The adjustment rod is connected to the subframe 23 by appropriate brackets and includes an adjustment handle 29. Movement of the adjustment handle 29 effectuates adjustment of the height of the cutting blade 22 with respect to the rollers 21 as discussed in more detail in the Dover '827 patent.

During cutting of the sod it is preferred that the blades 22 reciprocate forward and back. To effect this motion, the blade supports 26 are oscillated about their adjustment cams 27 by drive arms 30 rotatably connected to each support 26. The motion of the drive arms 29 is caused by a hydraulic motor and drive assembly (not shown) as disclosed in the Dover '827 patent.

As further disclosed and generally shown in the Dover '827 patent, the subframes 23 are preferably aligned such that one of the cutting blades 22 is mounted rearwardly of the other cutting blade 22. The cutting blades 22 may then be placed closer together in the lateral direction such that the interior ends of the cutting blades 22 are substantially aligned in the direction of movement. With this blade arrangement, the strip of sod cut by the rear cutting blade 22 includes the cut edge formed by the forward cutting blade 22 as it forms a strip of sod. It is noted that while the blade arrangement has been described with reference to two blades, this blade arrangement may be employed to cut any number of strips of sod.

Each of the sod cutting assemblies 20 of the present invention further includes a sod cut-off mechanism 33. A substantial portion of the sod cut-off mechanism 33 shown in FIG. 1 is covered by protective housings 34 and 35 secured to the subframe 23. The sod cut-off mechanism 33 is shown in greater detail, with the housings 34 and 35 removed, in FIGS. 3, 4 and 5. Each sod cut-off mechanism 33 is adapted to cut a strip of sod across its length and at set intervals generally as the sod is being stripped from the ground by the cutting blade 22. Each sod cut-off mechanism 33 includes a knife blade 36, a pair of support arms 37, an upper cross member 38, a cam 39, a cam follower 40, springs 41 and disengagement assembly 42.

The knife blade 36 is slightly wider than the cutting blade 22. The knife blade 36 is hingedly connected to the support arms 37 by hinges 43 (one of which is shown in FIG. 3). The support arms 37 are slidingly secured to side supports 45 which are mounted to the subframe 23. The sod cut-off mechanism 33 is secured to the subframe 23 such that the knife blade 36 is generally positioned in front of the rollers 21. Each support arm 37 is slidingly secured to a side support 45 by positioning the support arm 37 between at least one pair of rollers (not shown) secured to an inner surface of the respective side support 45.

The upper cross member 38 is secured to and extends across and beyond the support arms 37 at an upper end thereof. The upper cross member 38 also extends above and across upper ends of the side supports 45. A spring mount 47 is formed on each end of the upper cross member 38. The cam follower 40, comprising a wheel, is rotatably mounted to a front face of the upper cross member 38. A shoulder 49 extends rearwardly from a rear face of the cross member 38. As shown in FIG. 3, springs 41 are secured at one end to the spring mounts 47 on each end of the cross member 38 and at an opposite end to spring mounts 50 on a respective side support 45. The cam 39 is mounted on a shaft 55 which is rotatably mounted by bearings 56 to the side supports 45. A sprocket 57 is mounted to one end of the shaft 55. A chain 58, shown in dashed lines in FIG. 3, is connected to the sprocket 57 on the shaft 55 and to a sprocket 59 on the roller 21. Rotation of the roller 21 rotates the sprocket 59 which drives chain 58 and sprocket 57 causing the shaft 55 and cam 39 to rotate.

The cam 39 has a rounded surface and a flat surface and is eccentrically mounted on the shaft 55. As the cam 39 rotates, in the direction shown in FIG. 3, the rounded surface of the cam 39 engages the cam follower 40 and drives the cam follower upward until the cam follower 40 reaches the flat surface on the periphery of the cam 39 at which point the cam follower 40 drops down across the flat surface of the cam 39. The cross member 38, support arms 37 and knife blade 36 correspondingly rise and fall along with the cam follower 40. The cross member 38 is driven upward by the cam follower 40 against the tension of the springs 41. The tension on the extended springs 41 provides additional force for driving the knife blade 36 downward and into the ground in a cutting stroke. After the knife blade 36 is driven into the ground, the rounded surface of the cam 39 reengages the cam follower 40 to raise the knife blade 36. As the cutting unit 2 continues forward, the knife blade 36 pivots rearwardly about hinges 43 until the knife blade 36 is pulled out of the ground as the knife blade 36 is driven upward by the action of the cam 39.

An elastic cord or spring 65 is mounted at a first end 66 to an extension arm 67 on the cross member 38 and at a second end 68 to the knife blade 36. The cord 65 is mounted under tension and the first end is secured above the hinge 43 such that the tension on cord 65 biases the knife blade 36 to a vertical alignment after being pivoted rearward.

Figures 4, 5, 6:
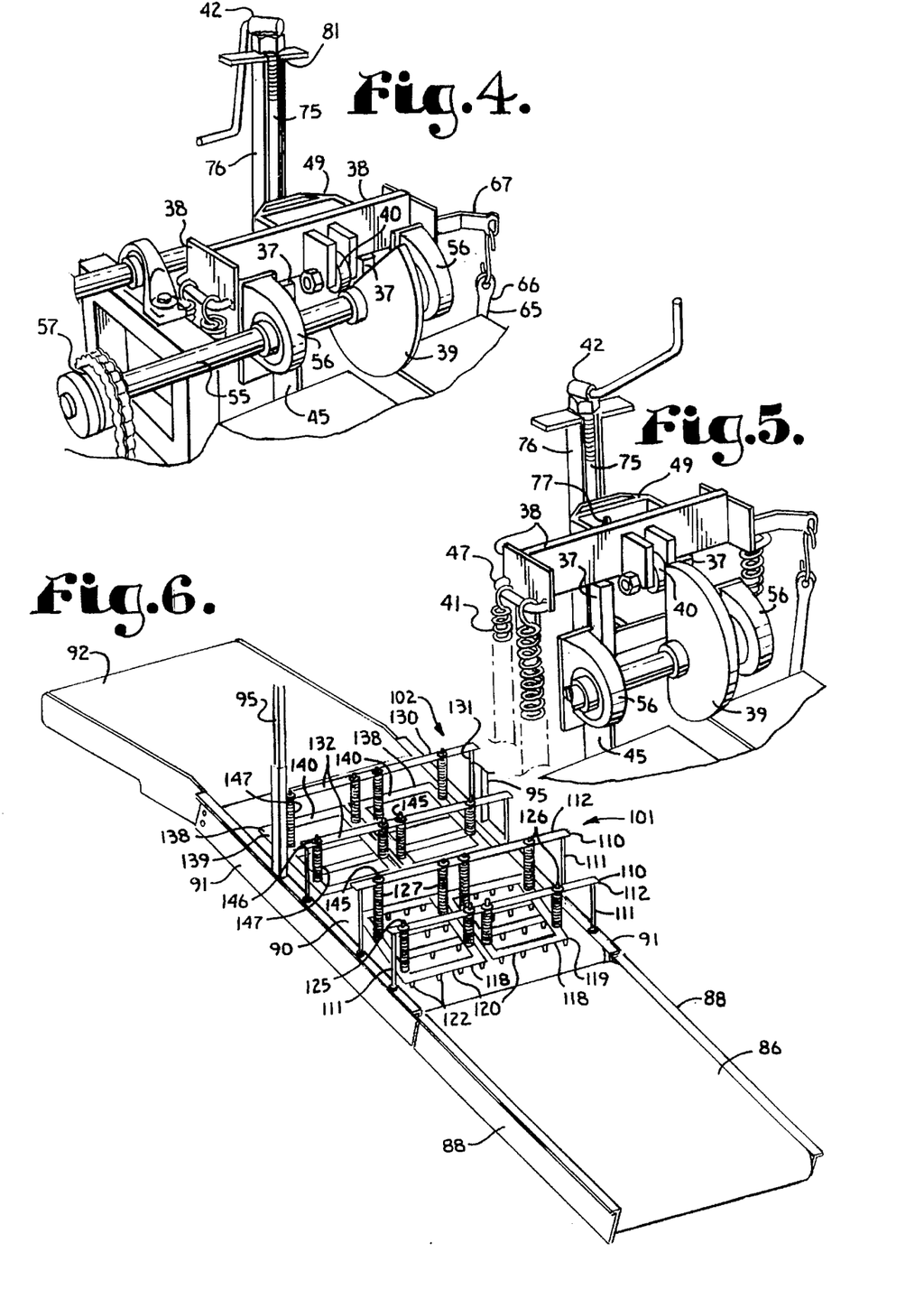
FIG. 4 is an enlarged and fragmentary perspective view of the sod cutting unit showing details of an upper portion of the sod cut-off mechanism.
FIG. 5 is an enlarged and fragmentary perspective view of the sod cutting unit similar to FIG. 4 showing the sod cut-off mechanism being disengaged.
FIG. 6 is a fragmentary perspective view of the conveyor assembly of the cutting unit of the present invention having the roller support and the small roll rolling attachment secured thereto.

The disengagement assembly 42 generally comprises a threaded bolt 75 rotatably secured within a housing 76 and a finger 77 threadingly secured to the bolt 75. The housing 76 is secured at a lower end 78 to a horizontal support member 79 extending between the side supports 45, behind the support arms 37 and below the shoulder 49 on the cross member 38. A lower end of the bolt 75 is rotatably secured to the housing at the lower end 78 thereof. An upper end of the bolt 75 is secured to a handle 80 which is rotatably secured to an upper end 81 of the housing 76.

The finger 77 is threadingly secured to the bolt 75 such that the finger 75 extends below the shoulder 49 on the cross member 38. Rotation of the handle 80 in the appropriate direction threadingly advances the finger 75 upward into engagement with the shoulder 49 raising the cross member 38, cam follower 40, support arms 37 and knife blade 36 against the tension of the springs 41. The finger 75 may be advanced upward far enough to raise the cam follower 40 out of engagement with the cam 39 through its entire path of travel, thus providing means for disengaging the sod cut-off mechanism 33. The sod cut-off mechanism 33 is engaged by rotating the handle 80 to threadingly lower the finger 75 a distance sufficient to remove the finger 75 from engagement with the shoulder 49.

Figure 2:
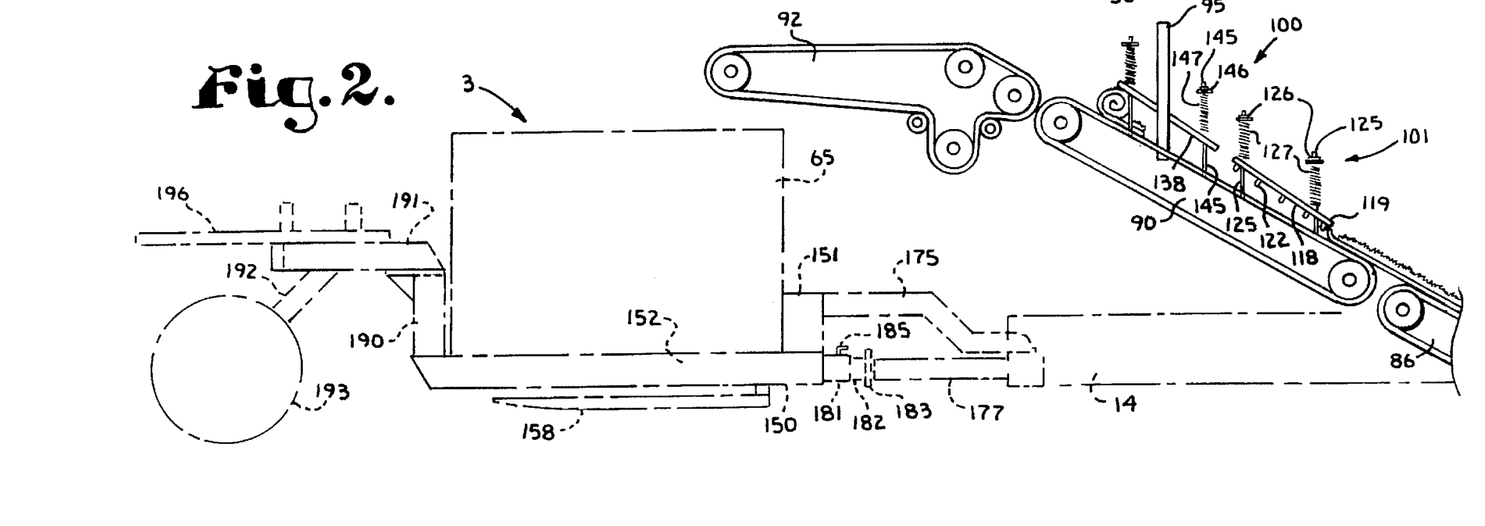
FIG. 2 is a fragmentary, schematic side view of a conveyor assembly of the present invention having a roller support and a small roll rolling attachment secured thereto and showing portions of the sod cutting unit and sod stacking unit in dashed lines.

The rear edge of each cutting blade 22 includes a plurality of tines 85 extending rearwardly and upwardly therefrom. The tines 85 guide and support the cut sod rearwardly to a first conveyor 86. As shown in FIGS. 2 and 6, the conveyor 86 inclines upwardly towards the rear of the unit 2 and is of standard design, including at least a pair of cylinders or pulleys supporting a conveyor belt. The first conveyor 86 includes a first set of upwardly inclined side frame members 88 which are connected to the mainframe 14. The first conveyor 86 may be driven by a conveyor motor (not shown) fixed to the mainframe 14. The conveyor motor is preferably a hydraulic motor having input and output hydraulic lines connectable to the hydraulic system of the towing vehicle.

A second conveyor 90 is mounted rearwardly of the first conveyor 86 such that the second conveyor 90 inclines upwardly towards the rear and provides a continuation of the first conveyor 86. The second conveyor 90 includes a second set of upwardly inclined side frame members 91. The second conveyor 90 is also of standard design, including a plurality of rollers or pulleys supporting a conveyor belt. The second conveyor 86 may be driven by the conveyor motor used to drive the first conveyor 86 or by a separate hydraulic motor. As generally discussed in the Dover '827 patent, the second conveyor 90 is pivotally connected to the main frame 14. The first and second conveyors 90 are collectively referred to as a conveyor assembly.

As further disclosed in the Dover '827 patent, the cutting unit 2 may include an exit ramp (not shown) secured to the side frame members 91 of the second conveyor 90. An extension or third conveyor 92, as shown in FIG. 6, is removably securable to the cutting unit 2 by bolting the third conveyor 92 to the second set of side frame members 91 of the second conveyor 90 after removing the exit ramp therefrom. The third conveyor 92 initially inclines upwardly towards the rear providing a continuation of the second conveyor 86 and then levels out relative to a front portion thereof. The third conveyor 90 is also of standard design, including a plurality of rollers or pulleys supporting a conveyor belt. A drive chain (not shown) may be connected between the second conveyor 90 and the third conveyor 92 to drive the third conveyor 92.

Figure 7:
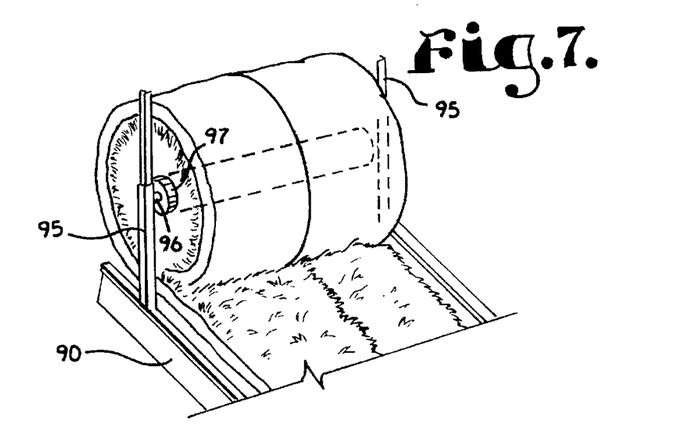
FIG. 7 is a fragmentary perspective view of the conveyor assembly of the sod cutting unit of the present invention configured for forming large rolls of sod.

As shown in FIG. 7, a mandrel or roller support 95 extends upward from each side of the second conveyor 90 towards the rear end thereof. The roller supports 95 provide an abutment against which the ends of a mandrel rod 96 may rest. The mandrel rod 96 is an elongated rod extending through the center of a cylindrical mandrel 97. The mandrel rod 96 is insertable in, and removable from, the mandrel 97. The mandrel rod 96 with a mandrel 97 attached thereto is removably securable to the roller supports 95.

A small roll rolling attachment 100, as shown in FIGS. 2 and 6, is removably securable to the side frame members 91 of the second conveyor 90 to extend across the second conveyor 90. The attachment 100 generally comprises a roll starting unit 101 and a roll finishing unit 102. The roll starting unit 101 comprises a pair of support brackets 110 having legs 111 and a cross member 112. The legs 111 may be bolted to the side frame members 91 of the second conveyor 90 such that the brackets 110 extend across the conveyor 90 one behind the other. Supported by the brackets 110 in adjacent alignment over the second conveyor 90 are a pair of trip trays 118. Each trip tray 118 is supported above the conveyor 90 across the path of a separate oncoming strip of sod. Each trip tray 118 includes a framework 119 having a plurality of slats 120 extending transverse to the direction of travel of sod up the conveyor 90. Spaced across and depending from each of the slats 120 is a plurality of cylindrical projections, fingers or stubs 122. A pair of support rods 125 extend from each bracket 110 to the framework 119 of the trip tray 118. Each rod 125 is fixedly secured at one end to the framework 119 and slidingly extends through a bore in the bracket 110. A stop plate or washer 126 is fixedly mounted on each rod 125 above the bracket 110 and prevents the rod 125 from sliding downward beyond a set point. The stop plates 126 are secured to the rods 125 such that each trip tray 118 angles from front to back away from the upper surface of the conveyor 90 and the stubs 122 on the forewordmost slat 120 are supported just slightly above the upper surface of the conveyor 90. A compressible coil spring 127 is mounted on each rod 125 and extends between the framework 119 and bracket 110. The roll finishing unit 102 is of similar construction as the roll starting unit 101 and comprises a pair of support brackets 130 having legs 131 and a cross member 132. The legs 131 may be bolted to the side frame members 91 of the second conveyor 90 such that the brackets 130 extend across the conveyor 90 one behind the other. The roll finishing unit 102 is removably securable to the second conveyor 90 behind the roll starting unit 101. Supported by the brackets 130 in adjacent alignment over the second conveyor 90 are a pair of roll up trays 138. Each roll up tray 138 is supported above the conveyor 90 across the path of a separate oncoming strip of sod. Each roll up tray 138 includes a framework 139 having a plurality of slats 140 extending transverse to the direction of travel of sod up the conveyor 90.

A pair of support rods 145 extend from each bracket 130 to the framework 139 of the roll up tray 138. Each rod 145 is fixedly secured at one end to the framework 139 and slidingly extends through a bore in the bracket 130. A stop plate or washer 146 is fixedly mounted on each rod 145 above the bracket 130 and prevents the rod 145 from sliding downward beyond a set point. The stop plates 146 are secured to the rods 145 such that each roll up tray 138 angles from front to back away from the upper surface of the conveyor 90. The roll up trays 138 are supported above and angled away from the upper surface of the second conveyor generally to extend coextensively with the trip trays 118. A compressible coil spring 147 is mounted on each rod 145 and extends between the framework 139 and bracket 130.

As a strip of sod engages the leading row of stubs 122, the stubs 122 flip the leading edge of the sod back onto itself and starts the sod rolling upon itself. As the strip of sod is further urged up the inclined conveyor 90, the leading rolled edge of the strip urges the front end of the trip tray 118 upward against the biasing force of springs 127 such that the leading rolled edge passes under the front end of the trip tray 118. The leading rolled edge of the sod continues up the conveyor whereupon it is engaged by and further rolled by each successive row of stubs 122. Further rolling of the strip of sod occurs as the sod subsequently passes under the roll up tray 38 through engagement of the leading rolled up edge of the sod against slats 140. Biasing of the trip trays 118 and roll up trays 138 against the sod as it is being rolled up also prevents the rolled up sod from rolling down the inclined surface of the conveyor 90. After passing completely under the roll finishing unit 102, the strip of sod is generally completely rolled up.

It is foreseen that currently available or subsequently developed apparatus designed for rolling strips of sod into small rolls as it is conveyed along a conveyor could be adapted for removable securement to the cutting unit of the present invention to replace the small roll rolling attachment disclosed herein.

As disclosed in the Dover '824 patent, the cutting unit can include means for applying a layer of netting to the sod as it is being harvested. Such means includes structure for rotatably supporting a roll of netting beneath the second conveyor 90 and structure for guiding the netting onto an upper surface of the second conveyor 90 over which strips of sod are advanced during harvesting.

The sod stacking unit 3 as shown in FIGS. 1, 2, 8 and 9 generally comprises a trailer having a trailer frame 150. The trailer frame 150 includes a forward frame member 151, and a pair of opposed side frame members 152 extending rearwardly from the forward frame member 151. The sod stacking unit 3 includes an open end and the opposed side frame members 152 generally define a sod stacking space extending therebetween. A fork lift assembly 157 of standard construction is secured to the forward frame member 151. The forklift assembly 157 preferably includes a pair of fork prongs 158 extending into the sod stacking space. The fork lift assembly 157 permits vertical movement of the fork prongs 158 between raised and lowered positions in the sod stacking space. The fork lift assembly 157 is preferably connected to the hydraulic system of the towing vehicle for raising and lowering the fork prongs 158.

Figures 8, 9, 10:
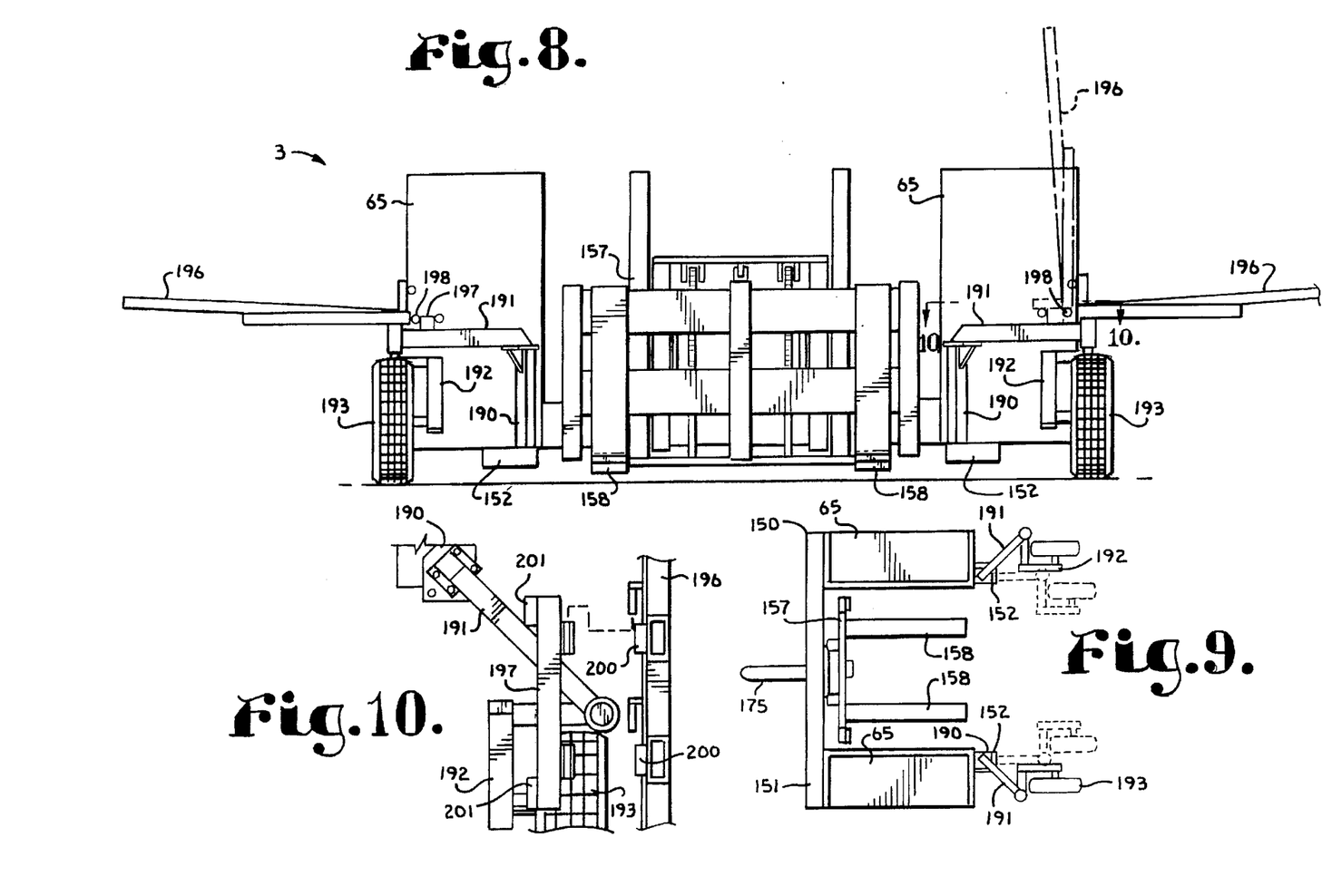
FIG. 8 is an enlarged rear elevational view of the sod stacking unit of the present invention.
FIG. 9 is a reduced, fragmentary and simplified top plan view of the sod stacking unit of the present invention.
FIG. 10 is an enlarged, exploded and fragmentary cross sectional view taken along line 10—10 of FIG. 8.

A worker support platform 165 is secured to each of the side frame members 152. Each worker support platform 165 includes a floor 166, a front wall 167, a forward side wall 168 and a rear side wall 169. The front wall 167 of each worker support platform is adjacent to and defines the sod stacking space. A hand and foot actuator (not shown) for controlling movement of the fork lift assembly are secured to the trailer frame and positioned to be accessible to a worker standing on the worker support platform 165. A trailer hitch 175 is secured to and extends forward from the forward frame member 151. The trailer hitch 175 is connectable to the main frame 14 of the cutting unit 2. A rear frame member 177 is secured to the main frame 14 of the cutting unit 2 and extends behind and across the main frame 14. Bumpers 180 are secured to opposite ends of and extend forward from the forward frame member 151 of the stacking unit 3. The bumpers 180 generally comprise a sleeve 181 secured to the frame member 151, a bar 182 slidingly received within the sleeve 181 and a plate 183 secured to a front end of the bar 182. A locking pin 185 may be inserted in a bore extending through the sleeve 181 and corresponding bores extending through the bar 182 to lock the bumper 180 in a set position after adjustment of the length of the bumper 180. The length of the bumpers 180 may be adjusted to place the bumper plates 183 in close proximity to the rear frame member 177 on the cutting unit 2 to prevent the stacking unit 3 from pivoting with respect to the curing unit 2.

Secured to a rear end of each side frame member 152 is a stanchion 190. Pivotally connected to each stanchion 190 is a strut 191. A wheel mounting bracket 192 is rotatably connected at one end about a vertical axis to the strut 191. A wheel 193 is rotatably connected about a horizontal axis to a second end of the bracket 192. The two points of rotation permit the wheels 193 to swivel or function as a caster.

The strut 191 is pivotal between a retracted alignment or position and an extended alignment or position. The strut 191 may be secured in either the retracted or extended alignment through means such as locking pins or bolts as generally shown in FIG. 9. In the retracted alignment, the struts 191 extend approximately straight rearward. In the extended alignment, the struts 191 are angled sideways such that the wheels 193 are positioned behind and well to the side of the sod stacking space throughout the path of rotation of the wheels 193.

A pallet support frame 196 is pivotally secured to each of the struts 191 by a brace 197. The brace 197 is welded to the strut 191 and the pallet support frame 196 is connected to the brace 197 by hinges 198. The pallet support frame 196 may be pivoted between a horizontal alignment for supporting a plurality of pallets and a vertical alignment when not used to support pallets particularly during transit and storage. The support frame may be locked in a vertical alignment using locking means such as locking pins inserted in aligned sleeves 200 and 201 on the support frame 196 and brace 197 respectively.

The method of using the sod harvesting system 1 of the present invention will now be described in more detail.

The cutting unit 2 with the sod cut-off mechanism 33 disengaged and without the third conveyor 92 or the sod stacking unit 3 attached thereto may be used to harvest sod in the form of large rolls as disclosed in the Dover '827 patent. In making large rolls using such a process, a mandrel 96 is rotatably secured to the roller supports 95 using a mandrel rod 97. With a mandrel 96 rotatably secured to the roller supports 95, an operator wraps a leading edge of a strip of sod around the mandrel 96 and the continued conveyance of the sod up the conveyor causes the sod to wrap around itself and the mandrel. The roll of sod is prevented from rolling down the inclined conveyors 90 and 86 due to the abutment of the mandrel rod 97 against the roller supports 95. As the diameter of the roll of sod increases, the mandrel 96 and mandrel rod 97 advance upward.

To cut the strip of sod to the desired length to form a large roll of sod, the sod may be cut by an operator with a knife during rolling, or the sod cut-off mechanism may be engaged and geared to result in a cut transverse to the path of travel at a desired distance.

Netting may be rolled in with the sod as disclosed in the Dover '827 patent. The large roll, having its trailing edge secured to the roll by pins or other appropriate means may then be removed from the unit 2 by pivoting the second conveyor 90 downward as discussed in more detail in the Dover '827 patent.

When it is desired to harvest sod in the form of unrolled strips or slabs, the cutting unit 2 is modified by connecting the third conveyor 92 thereto, engaging the sod cut-off mechanism 33 and connecting the sod stacking unit 3 to the cutting unit 2. The distance between transverse cuts by the sod cut-off mechanism 33 may be modified by changing the size of the sprockets 57 and 58.

After adjacent slabs of sod are stripped from the ground, they are conveyed up the first and second conveyors 86 and 90 to the third conveyor 92. Workers standing on the worker support platforms 165 lift the slabs of sod off of the third conveyor 92 and place them on a pallet (not shown) supported on fork prongs 158. Initially, the fork prongs 158 are raised to their highest alignment during the harvesting and stacking process. As the height of the sod stacked on a pallet supported on the fork prongs 158 increases, the fork prongs 158 are lowered. When a sufficient amount of sod is stacked on the pallet, the fork prongs 158 are lowered until the pallet rests on the ground and the unit 3 can then be pulled forward such that the fork prongs 158 are pulled out from engagement with the pallet and the open end of the unit 3 passes around the pallet.

When it is desired to harvest sod in the form of small rolls, the system 1, configured for harvesting unrolled strips of sod, is further modified by securing the small roll rolling attachment 100 to the second conveyor side frame members 91 such that the attachment 100 extends across the second conveyor 90. After the sod is rolled by the small roll rolling attachment, as discussed above, it is conveyed onto the third conveyor 92. As with unrolled strips of sod, workers standing on opposite support platforms 165 then lift adjacent rolls from opposite sides of the conveyor 92 and stack the rolls on a pallet supported by the fork prongs 58.

It is foreseen that netting may also be applied to the sod when it is harvested in the form of small rolls or slabs.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for harvesting sod comprising:
 (a) a cutting unit frame;
 (b) means for allowing movement of said cutting unit frame with respect to the ground in a cutting direction;
 (c) sod cutting means connected to said cutting unit frame for cutting a strip of sod from the ground;
 (d) a sod cut-off mechanism selectively engageable to cut a strip of sod transverse to its length at set intervals; said sod cut-off mechanism being secured to said cutting unit frame;
 (e) conveyor means connected to said cutting unit frame for conveying said strips of sod away from said cutting means;
 (f) first rolling means selectively engageable for rolling strips of sod to form small rolls; said first rolling means being securable to said apparatus adjacent said conveying means;
 (g) second rolling means selectively engageable for rolling strips of sod to form large rolls; said second rolling means being securable to said apparatus adjacent said conveying means; and (h) a sod stacking attachment removably securable to said cutting unit frame and upon which sod in the form of slabs and small rolls may be stacked.

2. The apparatus as disclosed in claim 1 further comprising:

(a) at least one worker support platform mounted to said sod stacking attachment.

3. The apparatus of claim 1 wherein said conveyor means comprises a conveyor assembly extending rearwardly from said cutting means.

4. The apparatus of claim 3 wherein said first rolling means comprises a small roll rolling attachment removably securable to said apparatus to extend across said conveyor assembly.

5. The apparatus of claim 3 wherein said second rolling means comprises a roller support selectively and rotatably supporting a roller across said conveyor assembly such that sod may be wound about said roller in a spiral configuration; said roller support including means for permitting said roller to advance generally vertically away from said conveyor assembly as the sod is wound in a spiral configuration around said roller.

6. The apparatus of claim 3 wherein said apparatus further includes an extension conveyor removably securable to said apparatus adjacent a rear end of said conveyor assembly to extend at least to a front end of said sod stacking attachment.

7. The apparatus of claim 1 wherein said sod stacking attachment comprises a trailer including:

(a) a trailer frame having a forward frame member extending transverse to the direction of travel of the apparatus and a pair of opposed side frame members extending rearwardly from said forward frame member to define a sod receiving space therebetween;

(b) a fork lift assembly secured to said forward frame member and having fork prongs extending into said sod receiving space for vertical movement between raised and lowered positions therein;

(c) a strut pivotally connected to a rear end of each of said side frame members; and (d) a wheel swivelly connected to each of said struts.

8. An apparatus for harvesting sod comprising:

(a) a cutting unit having a cutting unit frame;

(b) means for allowing movement of said cutting unit frame with respect to the ground in a cutting direction;

(c) a sod cutting blade connected to said cutting unit frame for cutting a strip of sod from the ground;

(d) a sod cut-off mechanism selectively engageable to cut a strip of sod across its length at set intervals; said sod cut-off mechanism being secured to said cutting unit frame;

(e) a conveyor assembly conveying said strips of sod away from said sod cutting blade;

(f) a small roll rolling attachment removably securable to said apparatus to extend across said conveyor assembly;

(g) a roller support selectively and rotatably supporting a roller across said conveyor such that sod may be wound about said roller in a spiral configuration; said roller support permitting said roller to advance generally vertically away from said conveyor as the sod is wound in a spiral configuration of continuously greater diameter;

(h) a sod stacking trailer selectively securable to said cutting unit at a rear end thereof, said trailer comprising;

(i) a trailer frame having a forward frame member extending transverse to the direction of travel of the apparatus and a pair of opposed side frame members extending rearwardly from said forward transverse frame member to define a sod receiving space therebetween;

(ii) a fork lift assembly secured to said forward frame member and having fork prongs extending into said sod receiving space for vertical movement between raised and lowered positions therein;

(iii) at least one worker support platform mounted on one of said side frame members;

(iv) a strut pivotally connected to a rear end of each of said side frame members; and (v) a wheel swivelly connected to each of said struts.

9. The apparatus as disclosed in claim 8 further comprising:

(a) a pallet support frame pivotally secured to each of said struts and pivotal between a lowered position and a raised position; each of said pallet support frames sized to receive and support a plurality of pallets when positioned in said lowered position.

10. The apparatus as disclosed in claim 8 further comprising:

(a) a worker support platform secured to each of said side frame members.

11. The apparatus as disclosed in claim 8 wherein said cutting unit comprises a trailer having a rear frame member extending across a rear end thereof and said sod stacking trailer includes at least two bumpers extending forward from said forward frame member in close proximity to said rear frame member for preventing said sod stacking trailer from rotating with respect to said cutting unit.

12. The apparatus as disclosed in claim 11 wherein the length of said bumpers is adjustable.

13. A sod stacking trailer for use with a sod harvesting apparatus having means for cutting strips of sod from the ground, a conveyor assembly for conveying said strips of sod away from said cutting means and means for selectively rolling said strips of sod into rolls of relatively small diameter, said sod stacking trailer comprising;

(a) a trailer frame having a forward frame member extending transverse to the direction of travel of the apparatus and a pair of opposed side frame members extending rearwardly from said forward frame member to define a sod receiving space therebetween;

(b) a trailer hitch secured to said trailer frame for removably securing said trailer to said sod harvesting apparatus;

(c) a fork lift assembly secured to said forward frame member and having fork prongs extending into said sod receiving space for vertical movement between raised and lowered positions therein;

(d) a worker support platform mounted on each of said side frame members on opposite sides of said sod receiving space;

(e) a strut pivotally connected to a rear end of each of said side frame members;

(f) a wheel swivelly connected to each of said struts; and (g) a pallet support frame pivotally secured to each of said struts and pivotal between a lowered position and a raised position; each of said pallet support frames sized to receive and support a plurality of pallets when positioned in said lowered position.

14. The apparatus as disclosed in claim 13 wherein said sod harvesting apparatus comprises a trailer having a rear frame member and said sod stacking trailer further includes at least two bumpers extending forward from said forward frame member in close proximity to said rear frame member for preventing said sod stacking trailer from rotating with respect to said cutting unit.

15. The apparatus as disclosed in claim 13 wherein the length of said bumpers is adjustable.

16. An apparatus for harvesting sod comprising:

(a) a cutting unit frame;

(b) means for allowing movement of said cutting unit frame with respect to the ground in a cutting direction;

(c) sod cutting means connected to said cutting unit frame for cutting at least two adjacent strips of sod from the ground;

(d) a sod cut-off mechanism selectively engageable to cut said strips of sod transverse to their length at set intervals; said sod cut-off mechanism being secured to said cutting unit frame;

(e) conveyor means connected to said cutting unit frame for conveying said strips of sod away from said cutting means;

(f) first rolling means selectively engageable for rolling said adjacent strips of sod to form separate small rolls; said first rolling means being securable to said apparatus adjacent said conveying means;

(g) second rolling means selectively engageable for simultaneously rolling said adjacent strips of sod to form adjacent large rolls which are supported together in side by side alignment; said second rolling means being securable to said apparatus adjacent said conveying means;

(h) a sod stacking attachment removably securable to said cutting unit frame and upon which sod in the form of slabs and small rolls may be stacked.

17. The apparatus as disclosed in claim 16 further comprising:

(a) means for wrapping a single sheet of netting around said adjacent strips of sod as said adjacent strips of sod are formed into a large roll.

18. The apparatus of claim 16 wherein said conveyor means comprises a conveyor assembly extending rearwardly from said cutting means.

19. The apparatus of claim 18 wherein said first rolling means comprises at least two small roll rolling attachments removably securable to said apparatus to extend across a path of conveyance of said strips of sod on said conveyor assembly.

20. The apparatus of claim 18 wherein said second rolling means comprises a roller support selectively and rotatably supporting a roller across said conveyor assembly such that sod may be wound about said roller in a spiral configuration; said roller support including means for permitting said roller to advance generally vertically away from said conveyor assembly as the sod is wound in a spiral configuration around said roller.

21. The apparatus of claim 18 wherein said apparatus further includes an extension conveyor removably securable to said apparatus adjacent a rear end of said conveyor assembly to extend at least to a front end of said sod stacking attachment.

* * * * *